US011688386B2

(12) United States Patent
Malone et al.

(10) Patent No.: US 11,688,386 B2
(45) Date of Patent: Jun. 27, 2023

(54) WEARABLE VIBROTACTILE SPEECH AID

(71) Applicant: Georgetown University, Washington, DC (US)

(72) Inventors: Patrick S. Malone, Washington, DC (US); Maximilian Riesenhuber, Washington, DC (US)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 16/643,824

(22) PCT Filed: Aug. 31, 2018

(86) PCT No.: PCT/US2018/049133
§ 371 (c)(1),
(2) Date: Mar. 2, 2020

(87) PCT Pub. No.: WO2019/046744
PCT Pub. Date: Mar. 7, 2019

(65) Prior Publication Data
US 2021/0074263 A1 Mar. 11, 2021

Related U.S. Application Data

(60) Provisional application No. 62/553,715, filed on Sep. 1, 2017.

(51) Int. Cl.
*G10L 15/02* (2006.01)
*G06F 3/01* (2006.01)
(Continued)

(52) U.S. Cl.
CPC .............. *G10L 15/02* (2013.01); *G06F 3/016* (2013.01); *G10L 21/16* (2013.01); *G10L 2021/065* (2013.01)

(58) Field of Classification Search
CPC ... G10L 15/02; G10L 21/16; G10L 2021/065; G06F 3/016; G09B 21/009; G10H 2220/311; G10H 1/00
See application file for complete search history.

(56) References Cited

U.S. PATENT DOCUMENTS 7,616,771 B2  11/2009  Lenhardt et al.
2010/0105364 A1*  4/2010  Yang ................. H04M 1/72445
                                                    704/235
(Continued)

FOREIGN PATENT DOCUMENTS

EP         2487557        8/2012

OTHER PUBLICATIONS

International Search Report and Written Opinion for related International Application No. PCT/US2018/049133, 12 pages, dated Jan. 7, 2020.

(Continued)

*Primary Examiner* — Michael N Opsasnick
(74) *Attorney, Agent, or Firm* — Klarquist Sparkman, LLP

(57) ABSTRACT

A method for training vibrotactile speech perception in the absence of auditory speech includes selecting a first word, generating a first control signal configured to cause at least one vibrotactile transducer to vibrate against a person's body with a first vibration pattern based on the first word, sampling a second word spoken by the person, generating a second control signal configured to cause at least one vibrotactile transducer to vibrate against the person's body with a second vibration pattern based on the sampled second word, and presenting a comparison between the first word and the second word to the person. An array of vibrotactile transducers can be in contact with the person's body. A method for improving auditory and/or visual speech perception in adverse listening conditions or for hearing-impaired (Continued)

individuals can also include sampling a speech signal, extracting a speech envelope, and generating a control signal configured to cause a vibrotactile transducer to vibrate again a person's body with an intensity that varies over time based on the speech envelope.

13 Claims, 8 Drawing Sheets

(51) Int. Cl.
    *G10L 21/16*     (2013.01)
    *G10L 21/06*     (2013.01)

(56) References Cited

U.S. PATENT DOCUMENTS

| | | |
|---|---|---|
| 2012/0306631 A1 | 12/2012 | Hughes |
| 2015/0156595 A1* | 6/2015 | Zhong ................... H04R 3/12 381/326 |
| 2015/0332659 A1* | 11/2015 | Ebeling .............. G09B 19/0015 84/645 |
| 2016/0012688 A1 | 1/2016 | Eagleman et al. |
| 2016/0291694 A1* | 10/2016 | Israr ........................ G06T 11/20 |
| 2018/0114566 A1* | 4/2018 | Aoyama .............. H04B 10/116 |
| 2019/0206405 A1* | 7/2019 | Gillespie ............ G06Q 30/0201 |

OTHER PUBLICATIONS

Israr et al., "Discrimination of Vowels with a Multi-finger Tactual Display," Symposium on Haptic Interfaces for Virtual Environments and Teleoperator Systems, pp. 17-24 (Mar. 13-14, 2008).
Partial Search Report for related EP Application No. 18850514.3, 11 pages, dated Jun. 8, 2021.

* cited by examiner

WEARABLE VIBROTACTILE SPEECH AID

CROSS-REFERENCE TO RELATED APPLICATIONS

This application is the U.S. National Stage of International Application No. PCT/US2018/049133 filed Aug. 31, 2018, which claims the benefit of U.S. Provisional Application No. 62/553,715 filed Sep. 1, 2017, which is incorporated by reference herein in its entirety.

FIELD

The present disclosure relates to vibrotactile speech aids and to methods related to such devices.

BACKGROUND

Humans process speech through auditory signals. Humans can also communicate through haptics. By converting auditory signals into haptic signals, humans can learn to recognize speech through vibrotactile sensations. Proper training can improve an individual's ability to recognize speech through haptics.

SUMMARY

Embodiments of a wearable vibrotactile speech aid are disclosed herein, as well as related training methods and methods of use. These embodiments can help improve speech recognition if used as a supplement to aural speech. Some embodiments can also enable speech perception without any complimentary aural speech recognition.

In one representative embodiment, a method for improving speech recognition can comprise sampling a speech signal, extracting a speech envelope from the speech signal, and generating a control signal configured to cause one or more vibrotactile transducer to vibrate against a person's body with an intensity that varies over time based on the speech envelope. The vibration can supplement or substitute for aural and/or visual speech recognition by the person.

In some embodiments, the speech envelope can be extracted using a Hilbert transform. In some embodiments, the speech envelope can be extracted using half-wave rectification and a low-pass filter. In some embodiments, the speech envelope can be extracted using a moving average filter.

In some embodiments, the control signal can be configured to cause the transducer to vibrate at a constant frequency.

In some embodiments, the control signal can be a first control signal configured to cause a first vibrotactile transducer to vibrate and the method can further comprise a second control signal configured to cause a second vibrotactile transducer to vibrate against the person's body with an intensity that varies over time based on the speech envelope.

In another representative embodiment, a method for improving speech recognition can comprise sampling a speech signal, extracting a speech envelope from the speech signal, and generating a control signal configured to cause at least one of an array of vibrotactile transducers to vibrate against a person's body. The number of vibrotactile transducers that the control signal causes to vibrate can be based on the speech envelope. The vibration can supplement aural and/or visual speech recognition by the person.

In some embodiments, each vibrotactile transducer that the control signal causes to vibrate can be caused to vibrate at a constant frequency. In some embodiments, each vibrotactile transducer that the control signal causes to vibrate can be caused to vibrate at a constant intensity.

In another representative embodiment, a method can comprise selecting a first word, generating a first control signal configured to cause at least one vibrotactile transducer to vibrate against a person's body with a first vibration pattern based on the first word, sampling a second word spoken by the person, generating a second control signal configured to cause at least one vibrotactile transducer to vibrate against the person's body with a second vibration pattern based on the sampled second word, and presenting a comparison between the first word and the second word to the person. An array of vibrotactile transducers can be in contact with the person's body.

In some embodiments, the comparison can be presented to the person in the form of auditory feedback. In some embodiments, the comparison can be presented to the person in the form of visual feedback. In some embodiments, the comparison can be presented as a percentage. In some embodiments, the comparison can be a similarity metric between the first word and the second word.

In some embodiments, the method can further comprise causing at least one of the vibrotactile transducers to vibrate with the first vibration pattern after presenting the comparison to the person, sampling a third word spoken by the person, generating a third control signal to cause at least one of the vibrotactile transducers to vibrate against the person's body with a third vibration pattern based on the sampled third word, presenting a comparison between the first word and the third word to the person, and repeating the previous steps of this method if the first word does not match the third word.

In some embodiments, the method can further comprise generating a first frequency decomposition of the first word and a second frequency decomposition of the second word. The first control signal can cause a first vibrotactile transducer to vibrate against the person's body with a vibration pattern based on a first frequency range of the first frequency decomposition and can cause a second vibrotactile transducer to vibrate against the person's body with a vibration pattern based on a second frequency range of the first frequency decomposition. The second control signal can cause the first vibrotactile transducer to vibrate against the person's body with a vibration pattern based on the first frequency range of the second frequency decomposition and can cause the second vibrotactile transducer to vibrate against the person's body with a vibration pattern based on the second frequency range of the second frequency decomposition.

In another representative embodiment, an apparatus can comprise a sampling device to sample a speech signal, a signal processing module to extract a speech envelope of the sampled speech signal, a conversion module to convert the sampled speech envelope into a vibration pattern, and a vibrotactile transducer to vibrate against a person's body. The vibration pattern can supplement aural and/or visual speech recognition by the person.

In some embodiments, the vibration pattern can have a constant frequency and an intensity that varies over time based on the speech envelope. In some embodiments, the signal processing module can extract the speech envelope using a Hilbert transform. In some embodiments, the signal processing module can extract the speech envelope using a half-wave rectification and a low-pass filter. In some embodiments, the signal processing module can extract the speech envelope using a moving average filter.

In another representative embodiment, an apparatus can comprise a sampling device to sample a speech signal, a signal processing module to obtain a frequency decomposition of the sampled speech signal, a conversion module to convert the frequency decomposition into a first vibration pattern, and an array of vibrotactile transducers to vibrate against a person's body. The first vibration pattern can supplement aural and/or visual speech recognition by the person.

In some embodiments, the conversion module can convert a first frequency range of the frequency decomposition into a second vibration pattern and can convert a second frequency range of the frequency decomposition into a third vibration pattern. A first one of the vibrotactile transducers can vibrate with the second vibration pattern and a second one of the vibrotactile transducers can vibrate with the third vibration pattern.

The foregoing and other objects, features, and advantages of the disclosed technology will become more apparent from the following detailed description, which proceeds with reference to the accompanying figures.

DETAILED DESCRIPTION

Humans can perceive speech and other audio signals through their sense of hearing. Some humans can also perceive speech through lip reading either in combination with, or in the lieu of hearing a speaker's voice. Another way that humans can perceive speech with proper training is through haptics. In this paradigm, speech can be converted into a vibration pattern and one or more vibrotactile devices can vibrate against a person's skin with that vibration pattern.

With proper training, an individual can learn to interpret different vibration patterns and recognize the word or words that they correspond to. In this way, a deaf individual is able to "hear" speech through a vibrotactile speech aid device. And such a vibrotactile device can also be used to supplement the hearing and/or speech recognition of non-deaf individuals as well. For example, someone with partial hearing loss could use such a device to supplement their hearing and/or lip reading. And a person without any hearing loss could use the device to improve speech recognition in a noisy environment such as a bar or airport.

Figure 1:
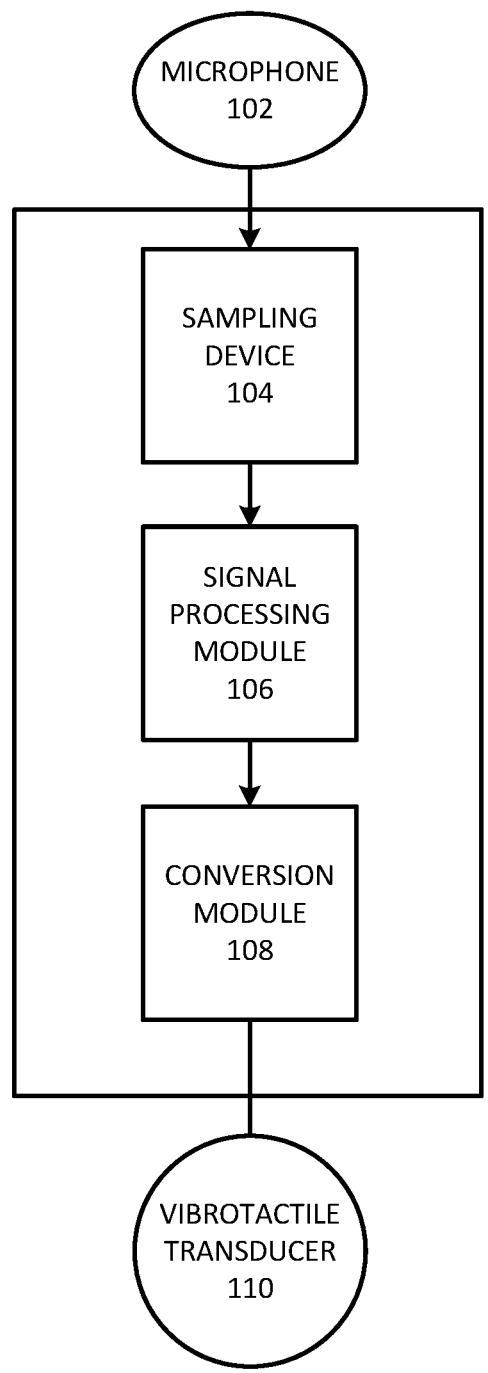
FIG. 1 is a schematic representation of an exemplary embodiment of a vibrotactile speech aid device.

FIG. 1 shows an exemplary single-channel vibrotactile speech aid device 100. The vibrotactile device 100 can be placed against a person's body to aid in speech recognition. For example, the vibrotactile device 100 can be placed against a person's wrist, forearm, fingertip, tongue, or any other part of a person's body. In some examples, the vibrotactile device 100 can be part of a watch, wristband, or other piece of jewelry or clothing.

The vibrotactile device 100 comprises a microphone 102, a sampling device 104, a signal processing module 106, a conversion module 108 and a vibrotactile transducer or motor 110. The microphone 102 can comprise any type of device capable of receiving or sensing audio signals. In some examples, the microphone 102 is omitted from the vibrotactile device 100 and instead an audio jack or audio interface is provided for a user to connect an external audio input or microphone to. Alternatively, in these examples a user can connect another audio source to the audio interface such as a digital media player or smartphone. In the illustrated example, the microphone 102 detects and transmits an audio signal to the sampling device 104. In examples where an audio interface is provided instead of a microphone, the audio interface connects to the sampling device 104.

The sampling device 104 receives an audio signal from the microphone 102 or from an audio interface. In the illustrated example, the sampling device 104 samples or digitizes the audio signal received from the microphone 102 or audio interface, thereby creating a digital audio signal. In other examples, the sampling device 104 can be omitted or can generate an analog audio signal from the audio signal received from the microphone 102 or audio interface. In the illustrated example, the sampling device 104 transmits the sampled audio signal to the signal processing module 106.

In some embodiments, the signal processing module 106 can receive a sampled audio signal from the sampling device 104 and can extract a speech envelope from the sampled audio signal. A speech envelope has a value equal to the amplitude of the audio signal at any point in time, as explained further in connection with FIG. 2 below. After the signal processing module 106 extracts a speech envelope, the extracted speech envelope can be transmitted to the conversion module 108.

Figure 2:
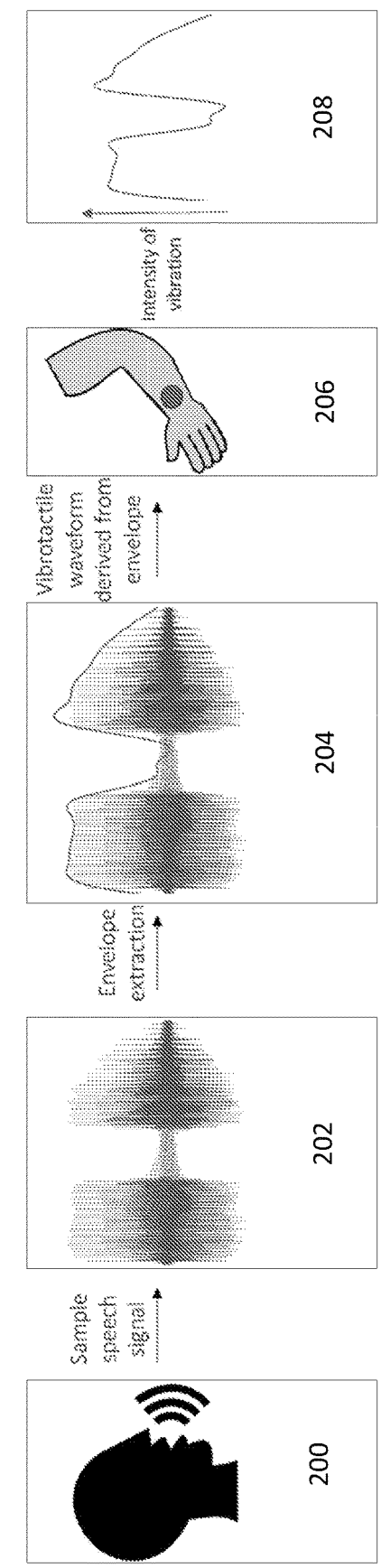
FIG. 2 shows a visual representation of the operation of the vibrotactile speech aid device of FIG. 1.

FIG. 2 shows a visual representation of the operation of the vibrotactile device 100. Referring to FIG. 2, block 200 shows microphone 102 receiving/sensing speech from a person speaking. Block 202 illustrates a waveform representation of a speech signal that can be sampled by the sampling device 104. Block 204 shows the speech envelope of the speech signal of block 202 that can be extracted by the signal processing module 106. The speech envelope contains sufficient information that speech from an audio signal can be recognized from just the extracted speech envelope of the audio signal. A variety of techniques can be used by the signal processing module 106 to extract a speech envelope, including the use of a Hilbert transform, a half-wave rectifier followed by a low-pass filter, or a moving average filter. Other techniques and methods of extracting a speech envelope can be used by the signal processing module 106 as well.

Referring back to FIG. 1, the conversion module 108 receives a speech envelope from the signal processing module 106 and converts the speech envelope into a vibration pattern. The vibration pattern can be generated such that the intensity of vibration as a function of time matches the amplitude of the speech envelope as a function of time. Block 206 of FIG. 2 shows a vibrotactile transducer on a person's arm and block 208 shows a plot of vibration intensity that varies over time that matches the speech envelope of block 204. After the conversion module 108 converts a speech envelope into a vibration pattern, a control signal is transmitted to the vibrotactile transducer 110 that causes the vibrotactile transducer to vibrate with the vibration pattern.

The vibrotactile transducer 110 receives the control signal from the conversion module 108 containing a vibration pattern and vibrates against a person's body according to the received vibration pattern. The vibrotactile transducer 110 can be a motor or other device capable of vibrating against a person's body and being felt by that person. In the illustrated example, the vibrotactile transducer 110 vibrates with a constant frequency and with an intensity that varies over time based on the speech envelope extracted by the signal processing module 106. In other examples, the frequency of vibration of the transducer 110 can vary based on the speech envelope.

In some examples, the vibrotactile transducer 110 can be replaced with multiple vibrotactile transducers. In these examples, the conversion module 108 can send a control signal that causes some number of vibrotactile transducers to vibrate based on the speech envelope. Specifically, the number of transducers that vibrate at a given time can be proportional to the amplitude of the speech envelope at that time. For example, when the amplitude of the speech envelope is low, only one transducer might vibrate. When the amplitude of the speech envelope is high, all of the transducers might vibrate. For any amplitude of the speech envelope in between a minimum and maximum value, some other number of transducers can vibrate.

In some of these examples, the number of transducers that vibrate at any given time is directly proportional to the amplitude of the speech envelope at that time. In other examples, there can be a non-linear relationship between the amplitude of the speech envelope and the number of transducers that vibrate. For example, there can be a logarithmic or exponential relationship between the amplitude of the speech envelope and the number of vibrating transducers. In some examples, the frequency and intensity of the vibration of the transducers is constant no matter how many transducers are vibrating. In other examples, the frequency and/or intensity of the vibration of the various transducers can vary based on the speech envelope. In some of the examples where there are multiple vibrotactile transducers as part of device 100, a person wearing the device 100 can interpret speech based on the number of transducers that vibrate over time. In other examples where there are multiple transducers as part of device 100, a person wearing device 100 can interpret speech based on other factors such as the frequency or intensity of the vibration of one or more of the transducers.

With proper training, a person can learn to recognize words and speech based on the vibration pattern they produce in the vibrotactile device 100. Potential training methodologies are discussed in more detail later in this disclosure. Once a person has acquired this capability, the vibrotactile device 100 can be worn by that person to either supplement or replace their audible recognition of speech. The vibrotactile device 100 can operate in real time such that a person wearing the device can feel the vibrations from the device at the same time that words are being spoken. As such, the vibrotactile device can supplement the speech recognition of a person wearing the device. For example, a person with partial hearing loss can wear the device to improve their recognition of speech. Or a person with normal hearing can wear the device in a noisy environment where speech is difficult to recognize, thereby improving their ability to recognize speech in such an environment.

Alternatively, the device can be used as the sole source of speech recognition without supplementing aural speech recognition. It should be understood that a speech aid as disclosed herein can be used to either supplement or replace aural speech recognition.

Figure 3:
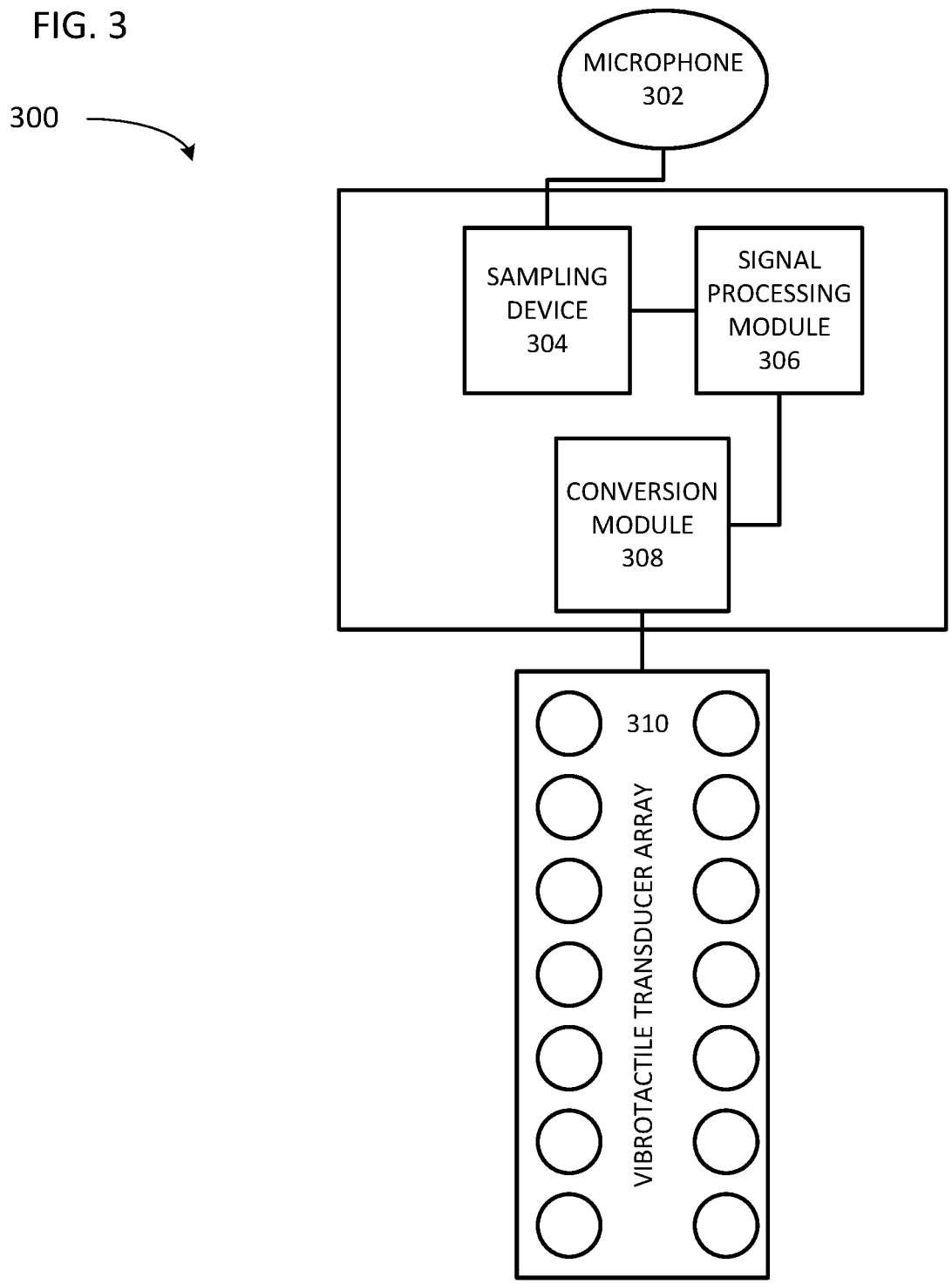
FIG. 3 is a schematic representation of another exemplary embodiment of a vibrotactile speech aid device comprising an array of vibrotactile transducers.

FIG. 3 shows an exemplary multi-channel vibrotactile device 300. Similar to the single channel vibrotactile device 100, the multi-channel vibrotactile device 300 can be placed against a person's body to improve speech recognition as described herein or can be a part of jewelry or clothing worn by the person. The vibrotactile device 300 comprises a microphone 302, a sampling device 304, a signal processing module 306, a conversion module 308, and an array of vibrotactile transducers 310.

The microphone 302 can be similar to the microphone 102 of FIG. 1. The microphone 302 can receive/detect audio and transmit the detected audio to the sampling device 304. In some examples, the microphone 302 can be omitted and replaced with an audio interface that can be used to connect any microphone or other audio input source.

The sampling device 304 can be similar to the sampling device 104 of FIG. 1. The sampling device 304 can sample audio detected by the microphone 302 and transmit sampled audio to the signal processing module 306.

The signal processing module 306 can receive a sampled audio signal from the sampling device 304 and obtain a frequency decomposition of the sampled audio signal received from the sampling device 304. That is, the signal processing module 306 can convert the time-domain audio signal into a frequency domain signal. This can be accomplished by using a Fourier transform algorithm or any other suitable technique. The frequency decomposition thus contains all of the spectral information that makes up the audio signal. After obtaining a frequency decomposition, the signal processing module 306 can transmit the frequency decomposition of the sampled audio signal to the conversion module 308.

The conversion module 308 can convert the frequency decomposition received from the signal processing module 106 to a vibration pattern and send a control signal to the transducers in the vibrotactile transducer array 310 to vibrate according to the vibration pattern. In the illustrated example, the array 310 comprises two rows of seven transducers each. However, in other examples, the array 310 can comprise any number of transducers in any arrangement. When the vibrotactile device 300 is worn by a person, for example on the person's forearm, the vibration of each transducer in the array 310 can be felt on a different part of that person's forearm or whatever part of their body they are wearing the device. This allows the wearer of the device to feel the vibration of each transducer in the array 310 individually.

In the illustrated example, the conversion module 308 generates a vibration pattern such that each transducer of the array 310 vibrates with an intensity that corresponds to a different band or frequency range of the received frequency decomposition. In the illustrated example, each of the 14 transducers represents a portion of the sound wave spectrum that is audible to humans, which is around 20 Hz to 20,000 Hz. For example, one transducer may correspond to frequencies between 20 Hz and 100 Hz, another transducer may correspond to frequencies between 100 Hz and 200 Hz, and so on. In operation, the conversion module 308 causes each transducer in the array 310 to vibrate with a constant frequency but with an intensity proportional to the average amplitude of a particular corresponding frequency band in the received frequency decomposition signal. In other examples, the signal processing module 306 and the conversion module 308 can utilize any other algorithm to convert the sampled audio signal into a vibration pattern with which the transducers of the vibrotactile transducer array 310 can vibrate.

With proper training, a person can learn to recognize spoken words based on the vibration felt while wearing either the single-channel vibrotactile device 100 or the multi-channel vibrotactile device 300. Two potential training methods are now be discussed that can train an individual to use the vibrotactile device 100, 300. Each training method is described below with respect to a person wearing vibrotactile device 300 but it should be understood that either training method can also be done with a person wearing vibrotactile device 100 or with any other vibrotactile device capable of turning speech into vibration patterns.

The first training method is passive vibrotactile speech training. In this training method, a person wears one of the vibrotactile devices 100, 300 and is presented with speech either from an external source or generated by the person wearing the device. As this speech is heard by the person wearing the device, they also feel the vibration pattern corresponding to the speech being heard in real time. This allows the device wearer to learn how different words and sounds feel. In one example, the person wearing the device can speak themselves and feel the vibration pattern that different sounds produce. This can allow the wearer of the device to try out different sounds and train themselves by speaking sounds they have difficulty recognizing until they are better able to detect them.

Figure 4:
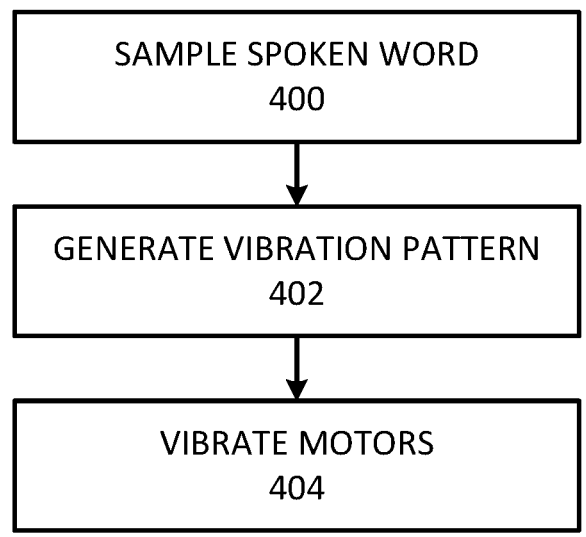
FIG. 4 is a flowchart representing an exemplary training method.
Figure 6:
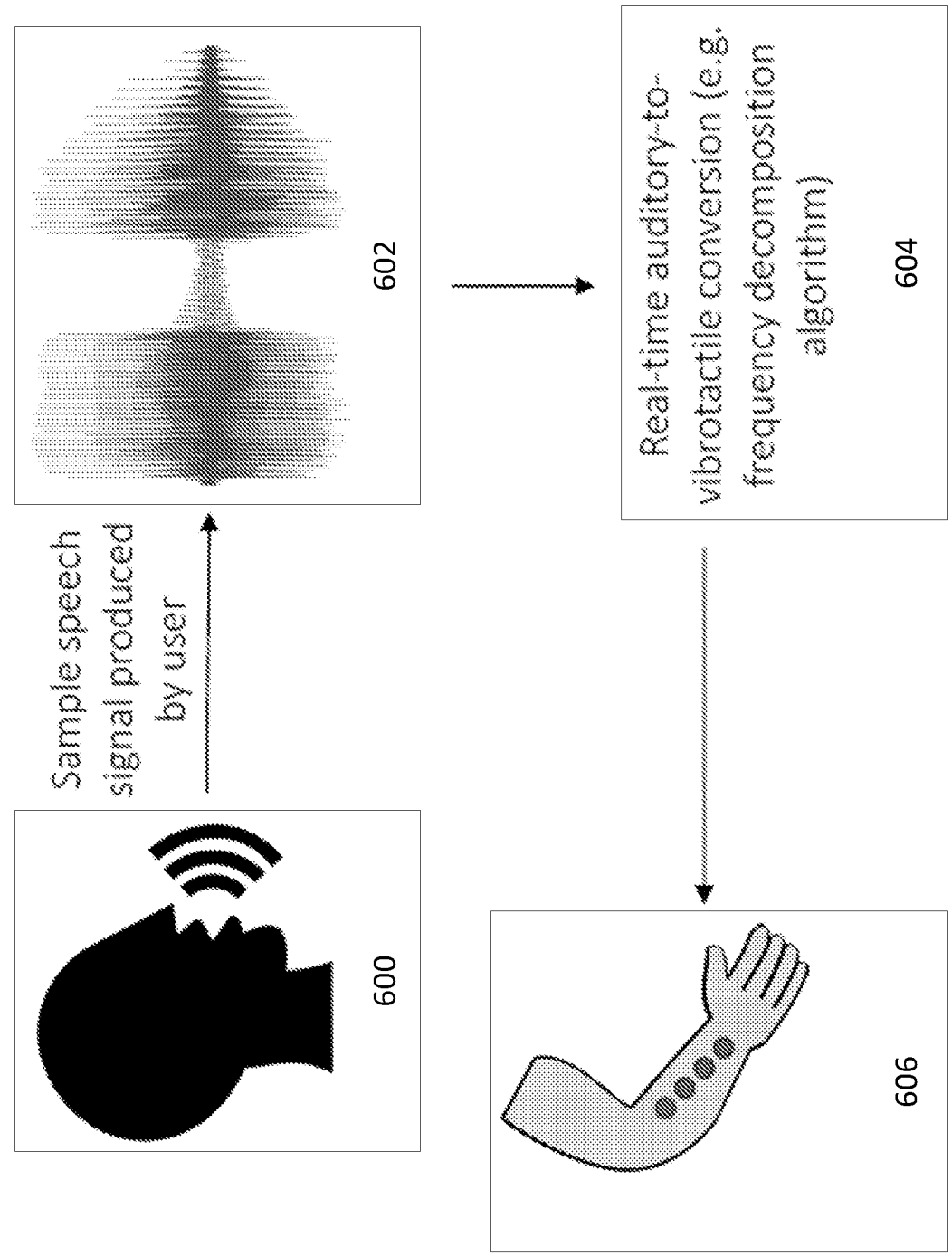
FIG. 6 shows a visual representation of the operation of the vibrotactile speech aid device of FIG. 3 in one exemplary embodiment.

FIG. 4 is a flowchart representative of the operation of a vibrotactile device during this passive training method. FIG. 6 shows a visual representation of the operation of the vibrotactile device during this training method. FIG. 4 begins when a training subject (i.e., a person wearing the vibrotactile device) speaks a word or sound and this speech signal is sampled (block 400). In the illustrated example, sampling device 304 samples a word or sound spoken into microphone 302. Block 600 of FIG. 6 shows microphone 302 receiving/sensing speech from a person speaking and block 602 shows a waveform representation of a speech signal that can be sampled by the sampling device 304.

After a speech signal is sampled, a vibration pattern is generated that corresponds to the sampled word (block 402). In the illustrated example, conversion module 308 generates a vibration pattern after receiving a frequency decomposition signal from the signal processing module 306 based on the sampled speech signal. Block 604 of FIG. 6 illustrates a vibration pattern generated from a frequency decomposition algorithm as discussed above. In other examples, the sampled word can be recognized by an auditory speech recognition algorithm and a stored vibration pattern corresponding to the recognized word can be selected.

After the vibration pattern is generated or selected, one or more transducers are vibrated against the body of the training subject (block 404). In the illustrated example, the transducers of vibrotactile transducer array 310 vibrate according to the vibration pattern generated by conversion module 308. This results in the training subject feeling the vibration pattern corresponding to a word or sound as they are speaking and/or hearing it. Block 606 of FIG. 6 shows four vibrotactile transducers on a person's arm that can vibrate based on the generated vibration pattern. In other examples, any number of vibrotactile transducers can be used.

This process can then be repeated any number of times with different words or sounds. The training subject can be encouraged to speak particular words that they have had difficulty identifying in the past or that are known typically to be difficult to identify based on vibration patterns. Over time, the training subject should begin to recognize the vibration pattern of different words and sounds.

A study was performed using the above described passive training method to demonstrate the feasibility of the disclosed vibrotactile device. Two normal-hearing participants performed a speech-in-noise identification task both with and without a vibrotactile device. Stimuli for the study included twelve vowel-consonant-vowel syllables (e.g., aba) embedded in white noise. Noise levels were calibrated for each participant using an adaptive staircase procedure so that accuracy for syllable identification was about 60%. Participants completed 3 blocks of 120 trials each. For one block of trials, no vibration was paired with the auditory stimuli. For another block, the auditory stimuli was paired with a vibration pattern on the vibrotactile device corresponding to the speech envelope of the stimuli. And for the last block, the auditory stimuli were paired with a control vibration of constant intensity. The order of the blocks was randomized for each participant.

Figure 7A:
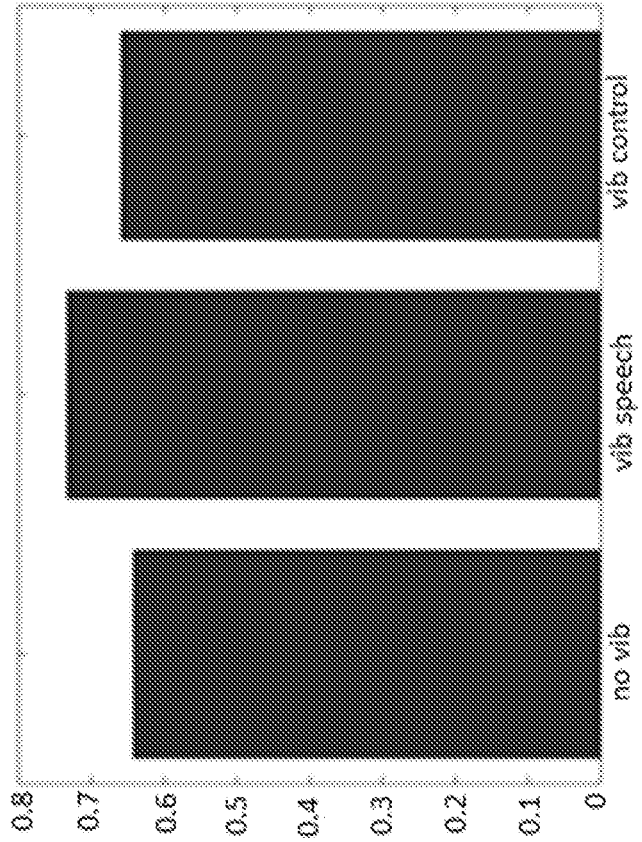
FIGS. 7A and 7B show results of a study on two participants using the disclosed vibrotactile device.
Figure 7B:
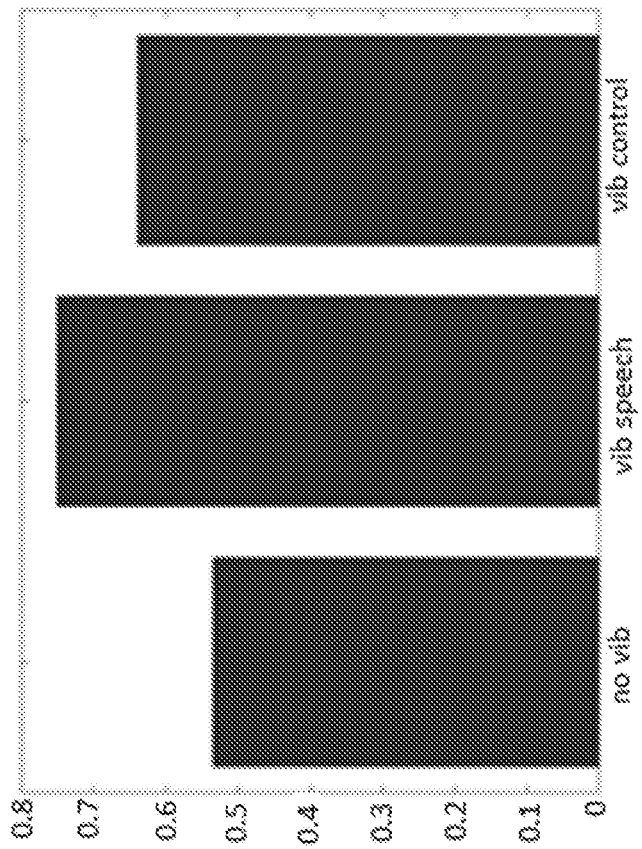

For participant 1, the vibrotactile speech envelope delivered by the vibrotactile device improved speech perception by 39.6% relative to the no vibration condition and 17.5% relative to the control vibration condition. These results are illustrated in FIG. 7A, which shows the accuracy of speech recognition for participant 1 for each of the three blocks. For participant 2, the vibrotactile speech envelope delivered by the vibrotactile device improved speech perception by 14% relative to the no vibration condition and 12.5% relative to the control vibration condition. These results are illustrated in FIG. 7B, which shows the accuracy of speech recognition for participant 2 for each of the three blocks. These results demonstrate the ability of the disclosed vibrotactile device to improve speech recognition in noisy environments.

Another training method comprises active production-perception speech training. In this training method, a training subject is actively presented with the vibrotactile representation of a certain word and then attempts to speak the word they were presented with. The vibrotactile presentation of the word can be repeated until the person correctly speaks the word back.

Figure 5:
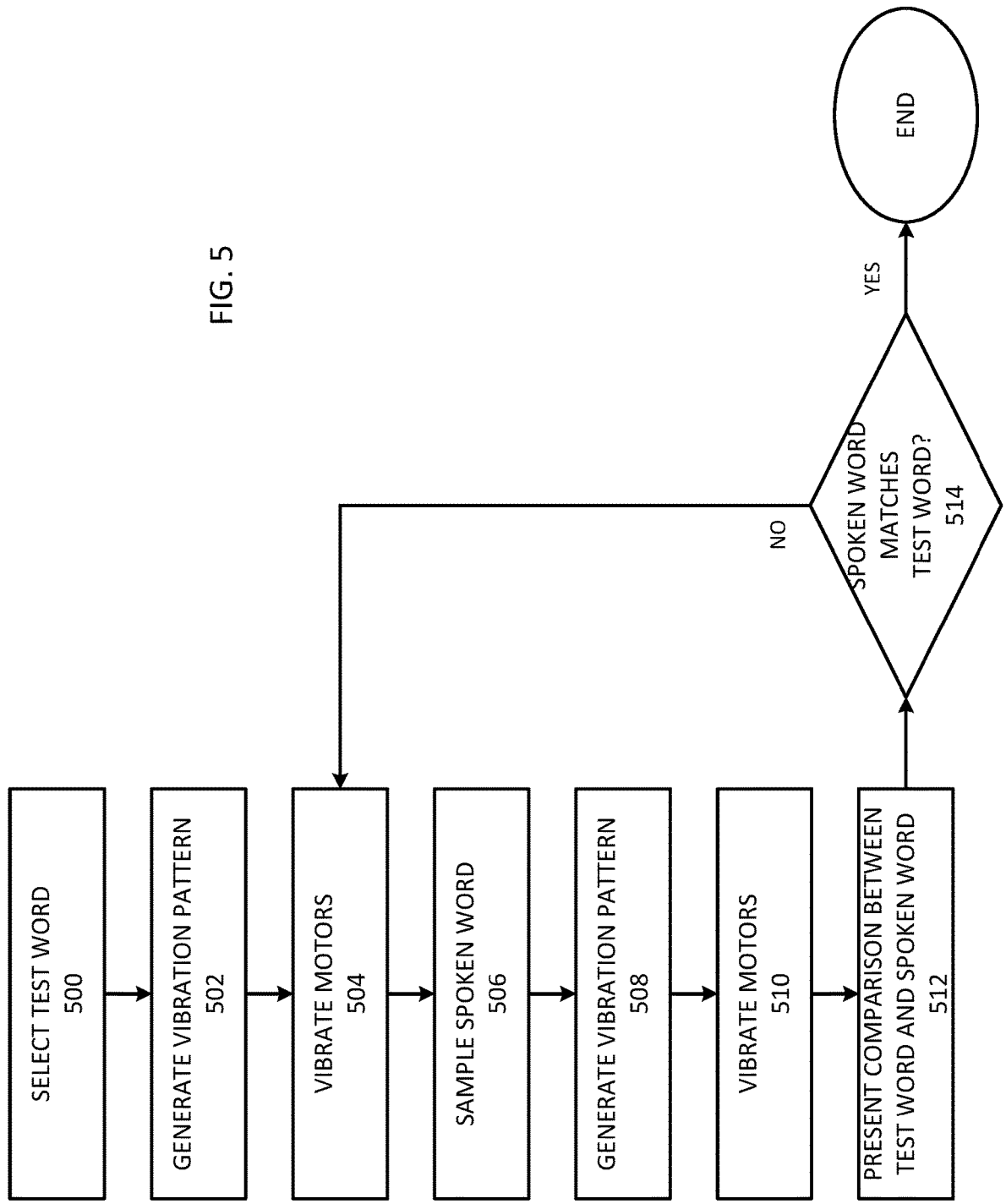
FIG. 5 is a flowchart representing another exemplary training method.

FIG. 5 is a flowchart representative of the operation of a vibrotactile device during this active training method. FIG. 5 begins when a target word or sound is selected (block 500). The target word could be a complete word, a partial word, a syllable, a sound, or a particular phonetic feature to be trained. The target word could be selected randomly, it could be selected because it contains a particular sound or set of sounds that are to be trained or that someone has had difficulty with in the past, or could be selected for any other reason.

Once a target word is selected, a vibration pattern corresponding to the target word is generated (block 502). The vibration pattern can be generated by having a person or computer speak the target word, by playing an audio recording of the target word, or the vibration pattern can be generated without the target word being spoken or played. In examples where the target word is spoken or a recording of the target word is played, the target word can be spoken or played into microphone 302 and the vibration pattern can be generated as described above with respect to device 300 of FIG. 3. In these examples, it is important that the training subject not be able to hear the word as this would defeat the training. In some examples, the training subject can wear earplugs, noise cancelling headphones, or other devices that artificially restrict the training subject's ability to hear. In other examples, a vibration pattern can be generated without the word actually being spoken or played. In these examples, a digital version of the word (e.g., a WAV file) can be transmitted directly to signal processing module 306 or vibration patterns for various target words can simply be stored electronically.

After a vibration pattern is generated, one or more vibrotactile transducers are vibrated based on the vibration pattern (block 504). This causes the training subject to feel the vibration pattern corresponding to a particular word. The training subject can then try to guess what word corresponds to the vibration pattern they felt and say that word. This spoken word is then sampled by the vibrotactile device (block 506) and a new vibration pattern is generated in real time based on this spoken word (block 508). The transducers of the device are then vibrated based on this new vibration pattern corresponding to the word spoken by the training subject (block 510). This allows the training subject to feel the vibration pattern of the word that they spoke and allows them to compare this vibration to the vibration of the target word.

After the transducers of the device vibrate with a vibration pattern based on the word spoken by the training subject, the training subject is presented with a comparison in the form of a similarity metric between the target word and the spoken word. In some examples, the similarity metric is presented visually. In other examples, the similarity metric is presented audibly. The similarity metric is a measure of how similar the spoken word is to the target word and allows the training subject to see how close their guess was to the actual target word. In some examples, the similarity metric is based on the number or characters or phonemes that are different between the spoken word and the target word. In some examples, the similarity metric is presented as a percentage. In some examples, the similarity metric is determined by projecting the target word and the spoken word into multidimensional space and then determining a Euclidian distance between the two signals.

After the transducers of the device vibrate with a vibration pattern based on the spoken word, a determination is made as to whether the spoken word matches the target word (block 512). That is, a determination is made as to whether the training subject correctly guessed the target word. If the spoken word does not match the target word, control returns to block 504 and the transducers again vibrate with a vibration pattern based on the target word. The remaining steps of FIG. 5 are then repeated with the training subject repeatedly guessing what the target word is until they guess correctly. Once the guess word spoken by the training subject matches the target word (block 514), the method of FIG. 5 ends. By continually prompting the training subject to guess the target word, the subject is encouraged to explore and produce a range of words and sounds. By presenting the training subject with a similarity metric for each guess, the subject will learn over time to identify words based on their vibration pattern.

Example Computing Systems

Figure 8:
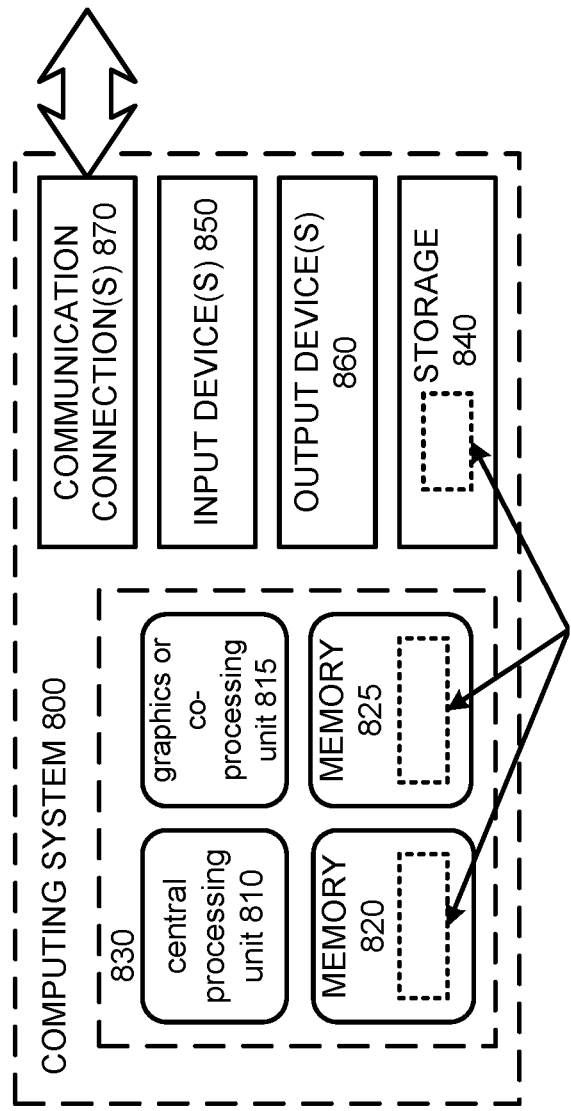
FIG. 8 is a diagram of an example computing system in which some described embodiments can be implanted.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8 this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include communication connections (e.g., 770) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved. Any feature of any embodiment can be combined with any other disclosed feature in any combination.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

The invention claimed is:

1. A method comprising:
   selecting a first target word for replication by a user;
   generating a first control signal configured to cause at least one vibrotactile transducer of an array of vibrotactile transducers in contact with the user's body to vibrate against the user's body with a first vibration pattern based on the first target word;
   prompting the user to attempt a first replication of the first target word;
   collecting an audio sample of the first replication of the first target word spoken by the user;
   generating a second control signal configured to cause at least one vibrotactile transducer of the array of vibrotactile transducers to vibrate against the user's body with a second vibration pattern based on the sampled first replication of the first target word;
   comparing the audio sample of the first replication of the first target word to an audio sample of the first target word to generate a comparison between the first target word and the first replication of the first target word; and
   presenting the comparison between the first word and the first replication of the first target word to the user.

2. The method of claim 1, wherein the comparison is presented to the user in the form of auditory feedback.

3. The method of claim 1, wherein the comparison is presented to the user in the form of visual feedback.

4. The method of claim 1, wherein the comparison is presented as a percentage.

5. The method of claim 1, wherein the comparison is a similarity metric between the first word and the second word.

6. The method of claim 1, further comprising:
   causing at least one of the vibrotactile transducers to vibrate with the first vibration pattern after presenting the comparison to the user;
   prompting the user to attempt a second replication of the first target word based on the first vibration pattern;
   collecting an audio sample of the second replication of the first target word spoken by the user;
   generating a third control signal to cause at least one of the vibrotactile transducers to vibrate against the user's body with a third vibration pattern based on the audio sample of the second replication of the first target word;
   presenting a comparison between the first target word and the second replication of the first target word to the user; and
   repeating the previous steps of this claim if the second replication of the first target word does not match the target word.

7. The method of claim 1, further comprising:
   generating a first frequency decomposition of the first word and a second frequency decomposition of the second word;
   wherein the first control signal causes a first vibrotactile transducer to vibrate against the user's body with a vibration pattern based on a first frequency range of the first frequency decomposition and causes a second vibrotactile transducer to vibrate against the user's body with a vibration pattern based on a second frequency range of the first frequency decomposition; and
   wherein the second control signal causes the first vibrotactile transducer to vibrate against the user's body with a vibration pattern based on the first frequency range of the second frequency decomposition and causes the second vibrotactile transducer to vibrate against the user's body with a vibration pattern based on the second frequency range of the second frequency decomposition.

8. A method comprising:
   selecting a first target word for replication by a user;
   generating a first control signal configured to cause a vibrotactile transducer in contact with the user's body to vibrate against the user's body with a first vibration based on the first target word;
   prompting the user to attempt a first replication of the first target word;
   collecting an audio sample of the first replication of the first target word spoken by the user;
   generating a second control signal configured to cause the vibrotactile transducer to vibrate against the user's body with a second vibration based on the sampled first replication of the first target word;
   comparing the audio sample of the first replication of the first target word to an audio sample of the first target word to generate a comparison between the first target word and the first replication of the first target word; and
   presenting the comparison between the first word and the first replication of the first target word to the user.

9. The method of claim 8, wherein the comparison is presented to the user in the form of auditory feedback.

10. The method of claim 8, wherein the comparison is presented to the user in the form of visual feedback.

11. The method of claim 8, wherein the comparison is presented as a percentage.

12. The method of claim 8, wherein the comparison is a similarity metric between the first word and the second word.

13. The method of claim 8, further comprising:
   causing the vibrotactile transducer to vibrate with the first vibration after presenting the comparison to the user;
   prompting the user to attempt a second replication of the first target word based on the first vibration;
   collecting an audio sample of the second replication of the first target word spoken by the user;
   generating a third control signal to cause the vibrotactile transducer to vibrate against the user's body with a third vibration based on the audio sample of the second replication of the first target word;
   presenting a comparison between the first target word and the second replication of the first target word to the user; and
   repeating the previous steps of this claim if the second replication of the first target word does not match the target word.

* * * * *